March 10, 1931. O. BARNACK 1,796,258
PRINTING APPARATUS FOR PHOTOGRAPHIC PURPOSES
Filed April 6, 1929
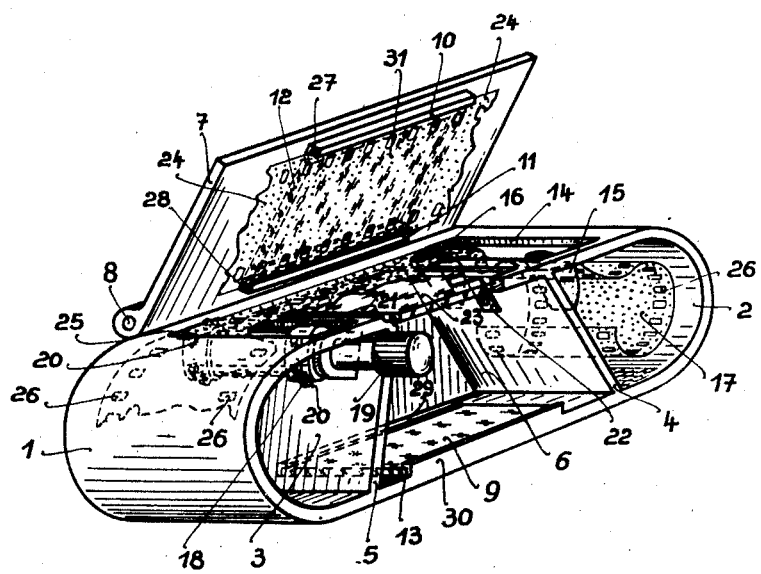
INVENTOR Patented Mar. 10, 1931

1,796,258

UNITED STATES PATENT OFFICE

OSKAR BARNACK, OF WETZLAR, GERMANY, ASSIGNOR TO THE FIRM OF ERNST LEITZ, OPTISCHE WERKE, OF WETZLAR, GERMANY

PRINTING APPARATUS FOR PHOTOGRAPHIC PURPOSES

Application filed April 6, 1929, Serial No. 353,092, and in Germany October 22, 1928.

This invention relates to an apparatus for printing diapositives from photographic negatives, in which the use of a source of light in the interior of the apparatus is superfluous.

My invention attains this by modifying the apparatus in such a manner that it contains a transparent exposure chamber enabling a perfect control of the film to be copied.

The accompanying drawing represents an apparatus that embodies the improvement. In this drawing one side wall of the apparatus, which is in reality fitted with a removable lid, is shown open in order to illustrate the interior of the apparatus. In a casing 1 is at one end a film keeping chamber 2 and at the other end a film winding chamber 3, both separated, by opaque partitions 4, 5, from the exposure chamber 6. The two chambers 2 and 3 can be closed light-tight by the cover 7, which is fixed to the casing 1 by a hinge 8. This hinged cover and the back wall of the casing have each a window 31, 9, which may be fitted with transparent glass plates 12, 13, filters or the like in frames 10, 11 and 29, 30. A similar transparent plate 23 is arranged in the front wall adjacent to the cover. A film strip 17 leads through slits 14, 25 in the front wall of the casing over two slide bars 15, 16 and over a film moving roll 18. The latter is provided at one end with a knob 19 to be acted by hand. In turning this knob 19 the teeth 20 of the roll engage into the perforations 26 of the film strip and move the latter from one chamber into the other. The slide bars 15, 16 and the film moving roll 18 project a little beyond the surface of the transparent plate 23 which rests on springs 21, 22, so that, as long as the hinged cover 7 is not folded down, the film will not touch the transparent plate 23. Only after the cover has been pressed down, the window-plate 31 projecting inside the cover holds a part of the film strip in contact with the transparent plate 23. The film is thus firmly kept between the two transparent plates 12 and 23, and together with the negative film to be copied, which has its place in the grooves 27, 28 of the window frame 10, 11.

The nature of this invention is that by the arrangement of the above mentioned transparent plates it becomes possible to look right through the whole apparatus, at the same time allowing to inspect the film contained therein and to judge the time of exposure required for the diapositive copy, without necessitating a source of light inside the apparatus.

Having described my invention, I declare that what I claim is:

A device for printing diapositives from photographic negatives, consisting of a casing with two film chambers, a film moving roll, a window in the back wall of the casing, another window arranged on springs in the front wall of the casing, a cover movably hinged on to the front wall, and an additional window in the cover that, when being closed, presses against the before mentioned window based on springs.

Signed at Frankfort-on-the-Main, Germany, this 18th day of March, A. D. 1929.

OSKAR BARNACK.